United States Patent Office 3,825,538
Patented July 23, 1974

3,825,538
OXAZINES AND MONO(SECONDARY AMINO-
METHYL)HYDROQUINONES AND PROCESS
FOR THEIR PREPARATION
Delbert Daniel Reynolds and Bernard Calvin Cossar,
Rochester, N.Y., assignors to Eastman Kodak Company, Rochester, N.Y.
No Drawing. Filed May 15, 1970, Ser. No. 37,907
Int. Cl. C07d 87/14
U.S. Cl. 260—244 R                                6 Claims

ABSTRACT OF THE DISCLOSURE

A process, including the step of reacting a bis(alkoxymethyl)amine with a phenol, hydroquinone or other hydroxy substituted aromatic compound, for the preparation of benzoxazines is taught. A method is disclosed for the preparation of mono(secondary-aminomethyl)hydroquinone developing agents which includes the step of refluxing or heating benzoxazines in the presence of a strong acid. Hydroquinones are employed as photographic developing agents and/or photographic developing precursors.

BACKGROUND OF THE INVENTION

Field of the Invention

This invention relates to novel derivatives of phenols, hydroquinone and other hydroxy-substituted aromatic compounds and their synthesis. In one of its aspects, this invention relates to a novel process for the preparation of 2H-1,3-benzoxazines. In another aspect this invention relates to novel 3,4-dihydro-3-substituted-6-hydroxy-2H-1,3-benzoxazines and 3,4-dihydro-3,7-disubstituted-6-hydroxy-2H-1,3-benzoxazines useful in photography. In another of its aspects, this invention relates to novel mono-(aminomethyl)hydroquinone developing agents and their method of preparation.

Description of the Prior Art

U.S. Pat. 3,462,266 discloses diffusion transfer processes in which certain mono- and bisoxazines serve as precursors for auxiliary silver halide developing agents. These precursor compounds are cleaved with alkali to form substantially colorless, alkali soluble hydroquinone developers. While a number of methods are known in the art for preparing the bisoxazine precursor agents, useful procedures are not available for preparing the monobenzoxazine precursor compounds, especially those which are 3- or 3,7-disubstituted - 3,4 - dihydro - 6 - hydroxy-2H-1,3-benzoxazines.

It is known, according to Burke et al., Journal Am. Chem. Soc., 71, 609 (1949), 74, 3601 (1952) and 76, 1677 (1954), that one may prepare 3,4-dihydro-2H-1,3-benzoxazines by the reaction at elevated temperature of primary amines and formaldehyde with monohydroxy, cyclic aromatic compounds such as phenols and naphthols. However, when this procedure is applied to polyhydroxy cyclic aromatic compounds, hydroquinone and phloroglucinol, for example, Burke and his co-workers, Journ. Org. Chem. 26, 4407 (1961) and Journ. Am. Chem. Soc. 72, 4691 (1950) obtained only the corresponding bis- and trisoxazines. Weatherbee et al., Trans. Illinois State Acad. Sci., 50, (1957), synthesized monobenzoxazines containing a free hydroxyl group from 4-t-butylcatechol and 2-t-butylhydroquinone. In these instances the t-butyl group sterically hinders the nuclear hydrogen atoms ortho to it from entering into bisoxazine formation. This procedure is limited to polyhydroxy compounds containing bulky, sterically active groups; it cannot be applied to hydroquinone itself or to hydroquinones bearing substituents which are sterically inactive.

Accordingly, a simple process for the preparation in good yield of 3,4-dihydro-6-hydroxy-2H-1,3-benzoxazines from hydroquinone itself or from variously substituted hydroquinones is highly desirable.

SUMMARY OF THE INVENTION

This invention is related to a novel process for preparing oxazine derivatives of hydroxy substituted aromatic compounds, said process comprising reacting a hydroxy-substituted aromatic compound with a bis(alkoxymethyl) amine in the presence of a strong acid at a temperature below about 25° C.

This invention further comprises novel secondary aminomethyl hydroquinones prepared from 3,4-dihydro-2H-1,3-benzoxazines and the novel method for their preparation.

It is an object of this invention to provide novel 3,4-dihydro-6-hydroxy-2H-1,3-benzoxazines substituted in the 3 or 3 and 7 position. It is a further object to provide a novel method for the preparation of 3,7-dihydro-6-hydroxy-2H-1,3-benzoxazines. It is a further object to provide a novel method for the preparation of oxazine derivatives of hydroxy substituted aromatic compounds. It is another object to provide 3,4-dihydro-6-hydroxy-2H-1,3-benzoxazines which can be employed in photographic systems as developing agent precursors. It is still another object to provide novel benzoxazines which are intermediates in the formation of novel secondary aminomethylhydroquinones. It is additionally an object of this invention to provide novel secondary aminomethylhydroquinones. It is still another object to provide a method of preparing secondary aminomethylhydroquinones. It is another object of this invention to provide secondary aminomethylhydroquinones which are good photographic developing agents and antifoggants.

DESCRIPTION OF THE PREFERRED EMBODIMENTS

In accordance with this invention, a novel and unobvious process is provided for the preparation of oxazine derivatives of hydroxy substituted aromatic compounds. The novel process comprises reacting a hydroxy substituted aromatic compound wtih a bis(alkoxymethyl)tertiary amine at a temperature below about 25° C. in the presence of a strong acid. In a suitable process an acidified, non-aqueous solution is maintained about below 25° C., typically between about −50° C. to about 25° C. To the solution is added a bis(alkoxymethyl)tertiary amine while maintaining the temperature below about 25° C., and thereafter allowing the mixture to stand at room temperature or heating to reflux.

The hydroxy substituted aromatic compounds employed in the novel process include those having at least one unsubstituted position adjacent to the hydroxy position.

In a preferred embodiment of this invention, the novel process is employed to obtain 3,4-dihydro-2H-1,3-benzoxazines from hydroquinones.

In another preferred embodiment of this invention, there is unexpectedly provided novel, 3,4-dihydro-3-substituted-6-hydroxy-2H-1,3-benzoxazines and novel 3,4-dihydro-3,7-disubstituted-6-hydroxy-2H-1,3-benzoxazines by the novel process described above. In order to obtain the benzoxazines, one employs a hydroquinone or a 2-substituted hydroquinone as the hydroxy substituted aromatic compound.

In still another embodiment, benzoxazines prepared by the process of this invention are cleaved by heating in acid solutions to afford novel 2-aminomethylhydroquinone acid salts.

The acid solutions of the benzoxazines can be prepared by adding a strong acid, such as a hydrohalide acid, to a neutral solution of the benzoxazines, to a solution of their acid salts, or the benzoxazine acid salts can be dissolved in an appropriate solvent. As will be understood hereinafter, the use of the term benzoxazine, will include not only the free base but also its acid salts.

A significant feature of the process for the preparation of the oxazines of this invention is that it is particularly specific for monobenzoxazines. The specificity of the process is particularly unobvious and unexpected in view of the prior art since the prior art processes led to the unwanted bisoxazine derivatives.

Another significant feature of this invention is that there is provided a simple procedure for preparing the desired monobenzoxazines in good yield which does not involve the use of formaldehyde and primary amines, thereby avoiding the side reactions and unwanted by-products associated with the use of these compounds.

Still another significant feature is that the process of this invention yields the desired monobenzoxazines in contrast to prior art processes in which similar bis(alkoxymethyl)amines and hydroquinones are heated to produce bisoxazines as the principle product.

A further significant feature is that the monobenzoxazines of this invention are not only useful by themselves in photographic processes, but they may be further reacted to produce other useful compounds, for example, N-substituted-aminomethylhydroquinones.

A still further significant feature is that the N-substituted aminomethylhydroquinones described above are not only useful as photographic developing agents, particularly incorporated developing agents, but they also exhibit unexpected fog stabilizing properties especially under conditions of high temperature and humidity.

Typical 3,4-dihydro-6-hydroxy-2H-1,3-benzoxazines of this invention have the structural formula:

I
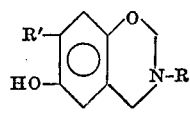

wherein R can be an alkyl group, including substituted alkyl groups such as methyl, ethyl, propyl, isopropyl, butyl, isobutyl, hexyl, 2-ethylhexyl, nonyl, decyl, dodecyl, etc., hydroxyalkyl such as beta-hydroxyethyl, gamma-hydroxypropyl, etc., aminoalkyl such as aminomethyl, N,N-dimethylaminoethyl, N,N - diethylaminoethyl, etc., and aralkyl such as benzyl, methylbenzyl, phenethyl, and the like; a cycloalkyl group, including substituted cycloalkyl groups such as cyclopentyl, cyclohexyl, methylcyclohexyl, cycloheptyl and the like; an alkenyl group such as allyl, 2-butenyl, 3-butenyl and the like; and an aryl group, including substituted aryl groups, such as phenyl, naphthyl, and alkaryl such as para-tolyl and the like; and R' can be an alkyl group, excluding tertiary butyl, including substituted alkyl groups, such as methyl, ethyl, propyl, isopropyl, butyl, isobutyl, hexyl, isooctyl, decyl, undecyl, dodecyl, etc., and an aralkyl group such as benzyl, methylbenzyl, phenethyl, and the like.

In a preferred aspect of the invention, the groups as represented by R and R' can have from 1 to 12 carbon atoms or even more. In another preferred aspect the groups, as represented by R and R' can have from 1 to 6 carbon atoms. It is further understood that with regard to the novel process for the preparation of benzoxazines as described herein, R' can also include hydrogen or tertiary butyl.

Compounds which are illustrative of the 3,4-dihydro-6-hydroxy-2H-1,3-benzoxazines prepared by the process of this invention are:

3,4-dihydro-3-hydroxyethyl-6-hydroxy-2H-1,3-benzoxazine,
3,4-dihydro-3-cyclohexyl-6-hydroxy-2H-1,3-benzoxazine,
3,4-dihydro-3-ethyl-6-hydroxy-2H-1,3-benzoxazine,
3,4-dihydro-3-benzyl-6-hydroxy-2H-1,3-benzoxazine,
3,4-dihydro-3-allyl-6-hydroxy-2H-1,3-benzoxazine,
3,4-dihydro-3-phenyl-6-hydroxy-2H-1,3-benzoxazine,
3,4-dihydro-3-N,N-dimethylaminoethyl-6-hydroxy-2H-1,3-benzoxazine,
3,4-dihydro-3-t-butyl-6-hydroxy-2H-1,3-benzoxazine,
3,4-dihydro-3-methyl-6-hydroxy-7-methyl-2H-1,3-benzoxazine,
3,4-dihydro-3-ethyl-6-hydroxy-7-methyl-2H-1,3-benzoxazine,
3,4-dihydro-3-propyl-6-hydroxy-7-methyl-2H-1,3-benzoxazine,
3,4-dihydro-3-butyl-6-hydroxy-7-methyl-2H-1,3-benzoxazine,
3,4-dihydro-3-allyl-6-hydroxy-7-methyl-2H-1,3-benzoxazine,
3,4-dihydro-3-benzyl-6-hydroxy-7-methyl-2H-1,3-benzoxazine,
3,4-dihydro-3-methyl-6-hydroxy-7-t-butyl-2H-1,3-benzoxazine,
3,4-dihydro-3-ethyl-6-hydroxy-7-t-butyl-2H-1,3-benzoxazine,
3,4-dihydro-3-propyl-6-hydroxy-7-t-butyl-2H-1,3-benzoxazine,
3,4-dihydro-3-isopropyl-6-hydroxy-7-t-butyl-2H-1,3-benzoxazine,
3,4-dihydro-3-propyl-6-hydroxy-7-benzyl-2H-1,3-benzoxazine,
3,4-dihydro-3-methyl-6-hydroxy-7-(p-methylbenzyl)-2H-1,3-benzoxazine,
3,4-dihydro-3-butyl-6-hydroxy-7-phenethyl-2H-1,3-benzoxazine,
3,4-dihydro-3-n-butyl-6-hydroxy-7-t-butyl-2H-1,3-benzoxazine,
3,4-dihydro-3-allyl-6-hydroxy-7-t-butyl-2H-1,3-benzoxazine, and
3,4-dihydro-3-benzyl-6-hydroxy-7-t-butyl-2H-1,3-benzoxazine.

The aromatic hydroxy compounds employed in the process of preparing the monobenzoxazines are desirably p-hydroquinones including p-hydroquinone itself and monosubstituted derivatives thereof represented by the structural formula:

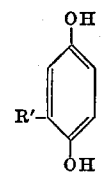

wherein R' is as defined hereinbefore, including additionally hydrogen and tertiary butyl.

Examples of suitable hydroquinones as described include:

hydroquinone,
methylhydroquinone,
ethylhydroquinone,
isopropylhydroquinone,
butylhydroquinone, isobutylhydroquinone,
2-ethylhexylhydroquinone,
octylhydroquinone,
isooctylhydroquinone,
decylhydroquinone,
dodecylhydroquinone,
benzylhydroquinone,
4-methylbenzylhydroquinone and
phenethylhydroquinone.

Typical of other aromatic hydroxy compounds which may be employed in the process of the invention include, but are not limited to, phenols, catechols, resorcinol, trihydric phenols and derivatives thereof.

Bis(alkoxymethyl)amines useful in the process of this invention are represented by the structural formula:

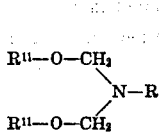

wherein R has the same values as described hereinbefore and $R^{11}$ is an alkyl group having from 1 to about 12 carbon atoms, and perferably from 1 to 4 carbon atoms. These compounds are well known and readily prepared by the Mannich reaction and involve a procedure such as that described in Fields, Miller and Reynolds, Journ. Org. Chem. 27, 2749 (1962), said article herein incorporated by reference.

Exemplary bis(alkoxymethyl)amines useful in this invention include the compounds disclosed in the Fields et al. reference and compounds such as:

bis(methoxymethyl)methylamine,
bis(methoxymethyl)ethylamine,
bis(propoxymethyl)butylamine,
bis(isobutoxymethyl)ethylamine,
bis(isobutoxymethyl)propylamine,
bis(isobutoxymethyl)isobutylamine,
bis(isobutoxymethyl)allylamine,
bis(octyloxymethyl)ethylamine,
bis(nonyloxymethyl)benzylamine,
bis(dodecoxymethyl)methylamine and
bis(benzyloxymethyl)propylamine.

The described process of this invention for preparing 3,4-dihydro-6-hydroxy-2H-1,3 - benzoxazines and other benzoxazines is typically carried out in the presence of a substantially anhydrous aprotic solvent having a freezing point below 15° C., and preferably below about −50° C. Useful solvents include, but are not limited to, the following: lower alkyl nitriles such as acetonitrile and propionitrile; lower dialkyl ethers such as dimethyl ether, diethyl ether and dipropyl ether; dioxane; and aromatic hydrocarbons such as benzene, toluene, chlorobenzene, o-dichlorobenzene and nitrobenzene. Although aprotic solvents are generally preferred, useful results have been obtained with lower alkyl alcohols such as methyl, ethyl and isobutyl alcohols and amides such as N,N-dimethylformamide.

The reaction is usually exothermic, the amount of heat evolved depending on the reactivity of the reagents employed. Control of the reaction is conveniently achieved by cooling a solution of the hydroquinone reactant in the range of about −50° C. to about 25° C., desirably about −40° C. to about −10° C. The solution is acidified by the introduction of an anhydrous strong acid in the vapor state, halogen acids such as hydrogen chloride and hydrogen bromide being preferred. In a preferred embodiment at least one molar equivalent of the acid is employed; however lesser or greater amounts may be used. The selected bis(alkoxymethyl)amine reactant is added at a rate such that the temperature of the reaction does not exceed 25° C. Often, when the hydroquinone solution has been cooled to about −45° to about −30° C., the bis(alkoxymethyl)amine may be added all at once. The monoxazines obtained are preferably isolated as acid salts comprising one molar equivalent of acid per mole of amine. In certain instances this quantity of acid is sufficient to effect the desired reaction between the hydroquinone and bis(alkoxymethyl)amine reactants.

Suitable concentrations of the described reactants can vary but normally stoichiometric quantities are employed. However, a small excess of the hydrogen halide may be used, 5–10 mole percent, for example.

When all of the bis(alkoxymethyl)amine has been added, the reaction can be completed by allowing the reaction mixture to stand at ambient temperature in the range of about 18° C. to about 25° C. for a period extending from about 30 minutes to about 24 hours. The time allowed for completion can vary widely. Alternatively, after standing from about 30 to about 60 minutes, completion of the reaction can be achieved by rapidly heating the reaction mixture to a reflux followed by cooling.

The product of the reaction, which is a benzoxazine hydrogen halide salt, is generally insoluble in the reaction mixture and it may be isolated by any of the usual procedures including filtration or centrifugation. Occasionally, it is advantageous to separate the product from the reaction mixture by partial or complete evaporation of the reaction solvent preferably at a temperature not exceeding about 50° C.

The 3,4-dihydro-6-hydroxy-2H - 1,3 - benzoxazines prepared according to the described process of this invention are desirably purified by recrystallization from a solvent such as acetonitrile, 2-butanone, alcohols such as ethyl alcohol and isopropyl alcohol, or a mixture of solvents, such as acetonitrile-methanol.

The novel, 3,4-dihydro-6-hydroxy-2H-1,3-benzoxazines obtained by the process of this invention are not in themselves developing agents for photographic silver salts, but are developing agent precursors capable of forming silver halide developing agents under alkaline conditions. Thus, the aforesaid benzoxazines may be incorporated to advantage, for example, as precursors for auxiliary silver halide developing agents in the dye developer diffusion transfer system disclosed in U.S. Pat. 3,462,266 and as precursors of silver halide developing agents in co-filed Reynolds and Fields U.S. Patent Application Ser. No. 37,916, entitled Photographic Compositions and Processes, now abandoned.

The benzoxazines produced by the process of this invention may be further reacted to provide a novel class of mono(aminomethyl)hydroquinones represented by the following structural formula:

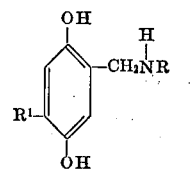

wherein $R^1$ and R have the values as described hereinabove and $R^1$ can additionally be hydrogen or tertiary butyl. Typical mono(aminomethyl)hydroquinones afforded by the benzoxazines of this invention include:

2-methylaminomethyl-5-methylhydroquinone,
2-propylaminomethyl-5-methylhydroquinone,
2-isobutylaminomethyl-5-ethylhydroquinone,
2-benzylaminomethyl-5-methylhydroquinone,
2-allylaminomethyl-5-butylhydroquinone,
2-phenylaminomethyl-5-octylhydroquinone,
2-phenylaminomethyl-5-ethylhydroquinone, 2-phenethylaminomethyl-5-dodecylhydroquinone,
2 - [N - (2 - dimethylaminoethyl)aminomethyl] - 5-isobutylhydroquinone,
2-methylaminomethyl-5-benzylhydroquinone, and
2-isopropylaminomethyl-5-phenethylhydroquinone.

The novel mono(aminomethyl)hydroquinones of this invention are formed by heating a solution of a corresponding benzoxazine, generally as the acid salt, in a suitable solvent such as water or a lower alkyl alcohol such as ethanol or isopropyl alcohol. The alcoholic solvents expedite the reaction by their scavenging action on formaldehyde evolved in the cleavage and are therefore preferred. The cleavage reaction is desirably effected in the presence of at least one equivalent of a strong acid although this is not a necessary concomitant to the reaction. Any acid capable of forming a salt with the mono(aminomethyl)hydroquinone may be used. Useful acids include hydrochloric and hydrobromic acids. The reaction mixture is heated at about 60° C. to about 110° C., depending on the solvent employed, until the reaction is completed, usually from about 1 to about 24 hours.

A preferred method is to reflux one of:

(a) the acid salt of the benzoxazine in a suitable solvent,
(b) the acid salt of the benzoxazine in a suitable solvent in the presence of a strong acid, such as HX, wherein X is a halide, hydrochloric acid being preferred, and
(c) the free base in a solvent in the presence of a strong acid.

A preferred method is refluxing the acid salt in the presence of a strong acid.

The mono(aminomethyl)hydroquinone is isolated as the acid salt by any convenient technique such as by evaporation of the solvent. Purification is typically effected by recrystallization from a solvent or mixture of solvents. If desired the mono(aminomethyl)hydroquinone may be converted to the free base by treatment with a weak base, sodium bicarbonate for example. As will be understood hereinafter, the use of the term "mono(aminomethyl)hydroquinone" will include the free base as well as the acid salts.

The novel mono(aminomethyl)hydroquinones provided by this invention are useful as photographic silver hailde developing agents which may be incorporated, for example, in the alkaline activator of a chemical transfer system. In addition, these compounds have unexpectedly been found to stabilize photographic silver halide emulsions against fog when incorporated therein, especially under conditions of high temperature and humidity. Furthermore, this highly desirable property is exerted without adversely affecting the sensitometric properties of the photographic emulsion.

This invention can be further illustrated by the following examples of preferred embodiments thereof, although it will be understood that these examples are included merely for illustrating this invention.

Examples 1-7

To anhydrous acetonitrile (300 ml.), 24.8 g. (0.2 mole) of methyl hydroquinone is added and the mixture is cooled to —30° C. in a Dry-Ice acetone bath. The temperature of the mixture is maintained at —30° C. while 8.0 g. of dry hydrogen chloride gas is introduced. Bis-(isobutoxymethyl)methylamine [40.6 g. (0.2 mole)] is added all at once to the above mixture. The solution is set aside for 30 minutes at room temperature and then warmed rapidly to reflux on a hot plate. The solution containing precipitated 3,4 - dihydro - 3,7-dimethyl-6-hydroxy - 2H - 1,3 - benzoxazine hydrochloride is cooled. The precipitate is collected by filtration and the product dried. The yield of the crude product is 36 g. (85 percent of theoretical). An analytical sample is recrystallized from a methanol-acetonitrile mixture, m.p. 192-193° C. The NMR spectrum in deuterated dimethylsulfoxide is as follows:

6.75 (s, 2, aromatic 5H and 8H): 5.13 (s, 2, —OCH$_2$N);
4.43 (s, 2, NCH$_2$Ar);
2.90 (s, 3, NCH$_3$); and
2.10 (s, 3, ArCH$_3$).

Analysis.—Calcd. for C$_{10}$H$_{14}$ClNO$_2$: C, 55.7; H, 6.5; Cl, 16.4; N, 6.5. Found: C, 55.7; H, 6.2; Cl, 16.3; N, 6.3.

Examples of other 3,7-disubstituted monobenzoxazines prepared in accordance with the procedure of Example 1 and using the appropriate bis(alkoxymethyl)amines and methylhydroquinone are shown in Table I below

TABLE I

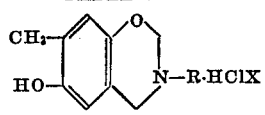

| Example number | Amine reactant | —R | Yield, percent | M.P., °C. | Analyses, calcd./found C | H | Cl | N | Chemical shifts (δ) of oxazine ring protons · —ArOCH$_2$— | —ArCH$_2$N— |
|---|---|---|---|---|---|---|---|---|---|---|
| 2 | (d) | —CH$_2$—CH$_3$ | 67 | a182-183 | 57.5 / 57.7 | 7.0 / 7.0 | 15.4 / 15.6 | 6.1 / 6.1 | 5.15 (s, 2) | 4.41 (s, 2) |
| 3 | (e) | —CH$_2$CH$_2$CH$_3$ | 53 | a181-183 | 59.1 / 59.5 | 7.4 / 7.5 | 14.5 / 14.2 | 5.8 / 5.6 | 5.10 (s, 2) | 4.43 (s, 2) |
| 4 | (f) | —CH$_2$CH$_2$CH$_2$CH$_3$ | 66 | b166-167 | 60.6 / 60.6 | 7.8 / 7.9 | 13.8 / 13.5 | 5.4 / 5.3 | 5.18 (s, 2) | 4.46 (s, 2) |
| 5 | (g) | —CH(CH$_3$)$_2$ | 75 | a177-178 | 59.1 / 59.2 | 7.4 / 7.5 | 14.5 / 14.3 | 5.8 / 5.8 | 5.13 (s, 2) | 4.45 (s, 2) |
| 6 | (h) | —CH$_2$—CH=CH$_2$ | 82 | b172-173 | 59.6 / 59.4 | 6.7 / 6.8 | 14.7 / 15.1 | 5.8 / 5.9 | 5.18 (s, 2) | 4.41 (s, 2) |
| 7 | (i) | —CH$_2$—C$_6$H$_5$ | 98 | a188-190 | 65.9 / 65.5 | 6.2 / 6.3 | 12.2 / 12.1 | 4.8 / 4.9 | 5.11 (s, 2) | 4.35 (s, 2) | a Recrystallized from acetonitrile—methanol mixture.
b Recrystallized from acetonitrile.
· The spectra are obtained in dimethylsulfoxide (deuterated).
d Bis(isobutoxymethyl)ethylamine.
e Bis(isobutoxymethyl)propylamine.
f Bis(isobutoxymethyl)butylamine.
g Bis(isobutoxymethyl)isopropylamine.
h Bis(isobutoxymethyl)allylamine.
i Bis(isobutoxymethyl)benzylamine.

Examples 8-12

The examples of 3-substituted monobenzoxazines shown in Table II, are prepared in the manner of Example 1, with the exception that hydroquinone itself is employed with the required bis(alkoxymethyl)amine derivative. The results are summarized in Table II.

3,825,538

TABLE II

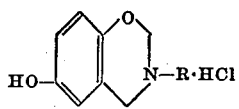

| Example number | Amine reactant | —R | Yield, percent | M.P., °C | Analyses, calcd./found C | H | Cl | N | Chemical shifts (δ) of oxazine ring protons[a] —AroCH₂— | —ArCH₂N— |
|---|---|---|---|---|---|---|---|---|---|---|
| 8 | (b) | —CH₃ | 66 | 158–159 | 53.6 / 53.5 | 6.0 / 5.9 | 17.6 / 17.4 | 7.0 / 6.8 | 5.23 | 4.55 |
| 9 | (c) | —C₂H₅ | 87 | 174–175 | 55.7 / 55.5 | 6.5 / 6.5 | 16.4 / 16.4 | 6.5 / 6.3 | 5.13 | 4.46 |
| 10 | (d) | —CH₂—CH₂—CH₃ | 70 | 152–153 | 57.5 / 57.6 | 7.0 / 6.8 | 15.4 / 15.5 | 6.1 / 6.4 | 5.16 | 4.48 |
| 11 | (e) | —C₄H₉-n | 77 | 137–138 | 59.1 / 58.9 | 7.4 / 7.3 | 14.5 / 14.2 | 5.8 / 5.7 | 5.20 | 4.51 |
| 12 | (f) | —CH₂—C₆H₅ | 73 | 172–173 | 64.9 / 64.8 | 5.8 / 5.6 | 12.8 / 12.7 | 5.0 / 5.1 | 5.16 | 4.41 |

[a] The spectra are obtained in dimethylsulfoxide (deuterated).
[b] Bis(isobutoxymethyl)methylamine.
[c] Bis(isobutoxymethyl)ethylamine.
[d] Bis(isobutoxymethyl)propylamine.
[e] Bis(isobutoxymethyl)butylamine.
[f] Bis(isobutoxymethyl)benzylamine.

Example 13

The following monobenzoxazines are prepared in the manner of Example 1:

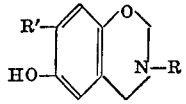

| | R | R' |
|---|---|---|
| (a) | C₂H₅— | CH₃(CH₂)₄CH₂— |
| (b) | (CH₃)₂CH— | CH₃CH=CHCH₂— |
| (c) | nC₄H₉ | C₆H₅— |
| (d) | (CH₃)₂C(CH₂)₃CH₂— | C₆H₅CH₂CH₂— |
| (e) | CH₃— | CH₃(CH₂)₃CH₂— |
| (f) | CH₃(CH₂)₈CH₂— | C₂H₅— |
| (g) | CH₃(CH₂)₁₀CH₂— | CH₂=CHCH₂— |
| (h) | C₆H₅CH₂— | CH₃CH₂CH₂— | a 3,4-dihydro-3-ethyl-6-hydroxy-7-n-hexyl-2H-1,3-benzoxazine.
b 3,4-dihydro-3-i-propyl-6-hydroxy-7-(2-butenyl)-2H-1,3-benzoxazine.
c 3,4-dihydro-3-n-butyl-6-hydroxy-7-phenyl-2H-1,3-benzoxazine.
d 3,4-dihydro-3-(5-methylhexyl)-6-hydroxy-7-phenethyl-2H-1,3-benzoxazine.
e 3,4-dihydro-3-methyl-6-hydroxy-7-n-pentyl-2H-1,3-benzoxazine.
f 3,4-dihydro-3-decyl-6-hydroxy-7-ethyl-2H-1,3-benzoxazine.
g 3,4-dihydro-3-dodecyl-6-hydroxy-7-allyl-2H-1,3-benzoxazine.
h 3,4-dihydro-3-benzyl-6-hydroxy-7-n-propyl-2H-1,3-benzoxazine.

As previously indicated, the monobenzoxazines of this invention can be converted to novel aminomethylhydroquinones which find use, for example, as developing agents. The conversion procedure is illustrated by Examples 14 and 15.

Example 14

One tenth mole of 3,4-dihydro-3-benzyl-6-hydroxy-2H-1,3-benzoxazine hydrochloride is slurried in 250 ml. of ethanol plus 10 ml. of concentrated hydrochloric acid and allowed to react at reflux for 1 hour. The reaction mixture is evaporated to near dryness. A mixture of ethanol plus acetonitrile is added and again stripped to dryness. The residue is slurried with acetonitrile filtered and recrystallized from acetonitrile plus acetone. The yield of benzylaminomethylhydroquinone hydrochloride, melting at 165–166° C is 40 percent.

Example 15

To an ethanol solution of 21.5 g. (0.1 mole) 3,4-dihydro-3,7-dimethyl-6-hydroxy-2H-1,3-benzoxazine hydrochloride, 10.0 ml. of concentrated hydrochloric acid is added. The mixture is refluxed for 16 hours, the ethanol removed under vacuum on a rotating evaporator, and the residue triturated in dry acetonitrile. The precipitated product which is collected by filtration and dried weighs 15.0 g. (74 percent theoretical). An analytically pure sample of the obtained 2-methylaminomethyl-5-methylhydroquinone hydrochloride is recrystallized by dissolving the product in a minimum of methanol and precipitating with acetonitrile, m.p. 198–200° C. The NMR spectrum in deuterated dimethylsulfoxide is as follows:

6.86 (s, 1, ArH);
6.80 (s, 1, ArH);
3.95 (s, 2, ArCH₂N);
2.51 (s, 3, N—CH₃); and
2.09 (s, 3, ArCH₃).

*Analysis.*—Calcd. for C₉H₁₄ClNO₂: C, 53.1; H, 6.9; Cl, 17.4; N, 6.9. Found: C, 53.1; H, 6.9; Cl, 17.6; N, 7.0.

Examples 16–20

The procedure of Example 15 is used to prepare the aminomethylhydroquinones shown in Table III.

TABLE III

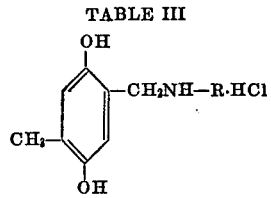

| Example number | Monobenzoxazine | R | Yield, percent | M.P., °C | Analyses, calcd./found C | H | Cl | N | Chemical shift (δ) for —CH₂N— |
|---|---|---|---|---|---|---|---|---|---|
| 16 | (1) | —C₂H₅ | 51 | 171–172 | 55.2 / 55.0 | 7.4 / 7.2 | 16.3 / 16.2 | 6.4 / 6.6 | 3.91 (s, 2) |
| 17 | (2) | —CH₂—CH₂CH₃ | 52 | 168–170 | 57.0 / 57.2 | 7.8 / 8.0 | 15.3 / 15.0 | 6.1 / 5.9 | 3.88 (s, 2) |
| 18 | (3) | —CH(CH₃)₂ | 59 | 178–180 | 57.0 / 57.3, | 7.8 / 7.6 | 15.3 / 15.9 | 6.1 / 6.3 | 3.88 (s, 2) |
| 19 | (4) | —C₄H₉-n | 49 | 167–168 | 58.6 / 58.7 | 8.2 / 7.9 | 14.4 / 14.2 | 5.7 / 5.8 | 3.91 (s, 2) |
| 20 | (5) | —CH₂—C₆H₅ | 71 | 207–209 | 64.4 / 64.4 | 6.5 / 6.5 | 12.8 / 12.3 | 5.0 / 5.2 | 3.91 (s, 2) |

1 3,4-dihydro-3-ethyl-6-hydroxy-7-methyl-2H-1,3,-benzoxazine.
2 3,4-dihydro-3-propyl-6-hydroxy-7-methyl-2H-1,3-benzoxazine.
3 3,4-dihydro-3-isopropyl-6-hydroxy-7-methyl-2H-1,3-benzoxazine.
4 3,4-dihydro-3-n-butyl-6-hydroxy-7-methyl-2H-1,3-benzoxazine.
5 3,4-dihydro-3-benzyl-6-hydroxy-7-methyl-2H-1,3-benzoxazine.

Example 21

2-methylaminomethyl-5-n-octylhydroquinone.HCl, m.p. above 300° C. (decomposition), is prepared from 3,4-dihydro-6-hydroxy-3-methyl-7-n-octyl - 2H - 1,3 - benzoxazine.HCl in the manner of Example 15.

As previously discussed, the aminomethylhydroquinones derived from the monobenzoxazines of this invention are useful as photographic developing agents. For example, they may be employed to advantage in an alkaline activator solution for a chemical transfer system.

In addition to their activity as photographic developing agents, the novel aminomethylhydroquinones of this invention have been found, quite surprisingly, to stabilize photographic silver halide emulsions against fog when incorporated therein. These compounds are particularly useful in photographic emulsions subjected to high temperature and humidity. This advantageous property is typically illustrated by the folowing example.

Example 22

Samples of Example 15 and the compounds listed in Table III are added to separate portions of a high-speed silver-bromoiodide emulsion which has been panchromatically sensitized with a cyanine dye. Each emulsion sample is coated on a cellulose acetate film support at a coverage of 459 mg. of silver and 1040 mg. of gelatin per square foot. A sample of each film coating is exposed on an Eastman 1B Sensitometer, processed for 5 minutes in Kodak DK–50 Developer, fixed, washed and dried. The sensitometric results are set forth in Table IV.

TABLE IV

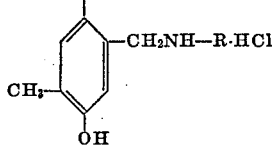

| R | Conc., g./Ag mole | Fresh test Rel. speed | $\gamma$ | Fog | 2 wk. 120° F./ 50% RH Rel. speed | $\gamma$ | Fog |
|---|---|---|---|---|---|---|---|
| Control | | 100 | 1.42 | .17 | 40 | 0.89 | .86 |
| —CH₃ | 20.0 | 71 | 1.60 | .11 | 71 | 1.47 | .22 |
| —C₂H₅ | 13.8 | 83 | 1.42 | .12 | 71 | 1.25 | .22 |
| —CH₂CH₂CH₃ | 20.0 | 65 | 1.60 | .11 | 71 | 1.20 | .21 |
| —CH(CH₃)₂ | 20.0 | 58 | 1.60 | .12 | 68 | 1.32 | .25 |
| —C₄H₉n | 10.0 | 83 | 1.60 | .12 | 74 | 1.32 | .24 |
| —CH₂—⟨phenyl⟩ | 20.0 | 53 | 1.25 | .18 | 43 | 1.05 | .41 |

Example 23

The compound of Example 21 is tested photographically by the procedure of Example 22 with the following results:

| Compound | Conc., g./Ag mole | Fresh test Rel. speed | $\gamma$ | Fog | 2 wk. 120° F./ 50% RH Rel. speed | $\gamma$ | Fog |
|---|---|---|---|---|---|---|---|
| Control | | 100 | 1.52 | 0.18 | 23 | 0.95 | .86 |
| Example 21 | 20 | 55 | 1.75 | 0.10 | 44 | 1.45 | .26 |

The silver halide emulsions used with this invention can comprise silver chloride, silver bromide, silver bromoiodide, silver chlorobromoiodide or mixtures thereof. The emulsions may be coarse or fine grain and can be prepared by any of the well-known procedures, e.g. single jet emulsions, double jet emulsions, such as Lippmann emulsions, ammoniacal emulsions, thiocyanate or thioether ripened emulsions such as those described in Nietz et al. U.S. Pat. 2,222,264 issued Nov. 4, 1940; Illingsworth U.S. Pat. 3,320,609 issued May 15, 1967; and McBride U.S. Pat. 3,271,157 issued Sept. 6, 1966. Surface image emulsions may be used or internal image emulsions such as those described in Davey et al. U.S. Pat. 2,592,250 issued Apr. 8, 1952; Porter et al. U.S. Pat. 3,206,313 issued Sept. 14, 1965; Berriman U.S. Pat. 3,367,778 issued Feb. 6, 1968, and Bacon et al. U.S. Pat. 3,447,927 issued June 3, 1969. If desired, mixtures of surface and internal image emulsions may be used as described in Luckey et al. U.S. Pat. 2,996,382 issued Apr. 15, 1961. Negative type emulsions may be used or direct positive emulsions such as those described in Leermakers U.S. Pat. 2,184,013 issued Dec. 19, 1939; Kendall et al. U.S. Pat. 2,541,472 issued Feb. 13, 1951; Berriman U.S. Pat. 3,367,778 issued Feb. 6, 1968, Schouwenaars British Pat. 723,019; Illingsworth et al. French Pat. 1,520,821; Ives U.S. Pat. 2,563,785 issued Aug. 7, 1951; Knott et al. U.S. Pat. 2,456,953 issued Dec. 21, 1968 and Land U.S. Pat. 2,861,885 issued Nov. 25, 1958. The emulsions may be regular grain emulsions such as the type described in Klein and Moisar, J. Phot. Sci., Vol. 12, No. 5, Sept./Oct., 1964, pp. 242–251.

The silver halide emulsions used with this invention may be unwashed or washed to remove soluble salts. In the latter case, the soluble salts may be removed by chill-setting and leaching or the emulsion may be coagulation washed, e.g., by the procedures described in Hewitson et al. U.S. Pat. 2,618,556 issued Nov. 18, 1952; Yutzy et al. U.S. Pat. 2,614,928 issued Oct. 21, 1952; Yackel U.S. Pat. 2,565,418 issued Aug. 21, 1951; Hart et al. U.S. Pat. 3,241,969 issued Mar. 22, 1966; and Waller et al. U.S. Pat. 2,489,341 issued Nov. 29, 1949.

The emulsions used with this invention may be sensitized with chemical sensitizers, such as with reducing agents; sulfur, selenium or tellurium compounds; gold, platinum or palladium compounds; or combinations of these. Suitable procedures are described in Sheppard et al. U.S. Pat. 1,623,499 issued Apr. 5, 1927; Waller et al. U.S. Pat. 2,399,083 issued Apr. 23, 1946; McVeigh U.S. Pat. 3,297,447 issued Jan. 10, 1967; and Dunn U.S. Pat. 3,297,446 issued Jan. 10, 1967.

The silver halide emulsions used with this invention may contain speed increasing compounds such as polyalkylene glycols, cationic surface active agents and thioethers or combinations of these as described in Piper U.S. Pat. 2,886,437 issued May 12, 1959; Dann et al. U.S. Pat. 3,046,134 issued July 24, 1962; Carroll et al. U.S. Pat. 2,944,900 issued July 12, 1960; and Goffe U.S. Pat. 3,294,540 issued Dec. 27, 1966.

The silver halide emulsions used with the invention disclosed herein can be protected against the production of fog and can be stabilized against loss of sensitivity during keeping. Suitable antifoggants and stabilizers each used alone or in combination include thiazolium salts described in Brooker et al. U.S. Pat. 2,131,038 issued Sept. 27, 1938 and Allen et al. U.S. Pat. 2,694,716 issued Nov. 16, 1954; the azaindenes described in Piper U.S. Pat. 2,886,437 issued May 12, 1959, and Heimbach et al. U.S. Pat. 2,444,605 issued July 6, 1948; the mercury salts as described in Allen et al. U.S. Pat. 2,728,663 issued Dec. 27, 1955; the urazoles described in Anderson et al. U.S. Pat. 3,287,135 issued Nov. 22, 1966; the sulfocatechols described in Kennard et al. U.S. Pat. 3,236,652 issued Feb. 22, 1966; the oximes described in Carroll et al. British Pat. 623,448; nitron; nitroindazoles; the mercaptotetrazoles described in Kendall et al. U.S. Pat. 2,403,927 issued July 16, 1946; Kennard et al. U.S. Pat. 3,266,897 issued Aug. 16, 1966, and Luckey et al. U.S. Pat. 3,397,987 issued Aug. 20, 1968; the polyvalent metal salts described in Jones U.S. Pat. 2,839,405 issued June 17, 1958; the thiuronium salts described in Herz. et al. U.S. Pat. 3,220,839 issued Nov. 30, 1965; the palladium, platinum and gold salts described in Trivelli et al. U.S. Pat. 2,566,263 issued Aug. 28, 1951, and Yutzy et al. U.S. Pat. 2,597,915 issued May 27, 1952.

The photographic and other hardenable layers used with the invention disclosed herein can be hardened by various organic or inorganic hardeners, alone or in combination, such as the aldehydes, and blocked aldehydes, ketones, carboxylic and carbonic acid derivatives, sulfonate esters, sulfonyl halides and vinyl sulfonyl ethers, active halogen compounds, epoxy compounds, aziridines, active olefins, isocyanates, carbodiimides, mixed function hardeners and polymeric hardeners such as oxidized polysaccharides like dialdehyde starch and oxyguargum and the like.

The photographic emulsions and elements described in the practice of this invention can contain various colloids alone or in combination as vehicles, binding agents and various layers. Suitable hydrophilic materials include both naturally-occurring substances such as proteins, for example, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like.

The described photographic emulsion layers and other layers of a photographic element employed in the practice of this invention can also contain alone or in combination with hydrophilic, water permeable colloids, other synthetic polymeric compounds such as dispersed vinyl compounds such as in latex form and particularly those which increase the dimensional stability of the photographic materials. Suitable synthetic polymers include those described, for example, in Nottorf U.S. Pat. 3,142,568 issued July 28, 1964, White U.S. Pat. 3,193,386 issued July 6, 1965; Houck et al. U.S. Pat. 3,062,674 issued Nov. 6, 1962; Houck et al. U.S. Pat. 3,220,844 issued Nov. 30, 1965; Ream et al. U.S. Pat. 3,287,289 issued Nov. 22, 1966; and Dykstra U.S. Pat. 3,411,911 issued Nov. 19, 1968; particularly effective are those water-insoluble polymers of alkyl acrylates and methacrylates, acrylic acid, sulfoalkyl acrylates or methacrylates, those which have cross-linking sites which facilitate hardening or curing, those having recurring sulfobetaine units as described in Dykstra Canadian Pat. 774,054.

The photographic elements used with this invention may contain antistatic or conducting layers, such layers may comprise soluble salts, e.g. chlorides, nitrates, etc., evaporated metal layers, ionic polymers such as those described in Minsk U.S. Pat. 2,861,056 issued Nov. 18, 1958, and Sterman et al. U.S. Pat. 3,206,312 issued Sept. 14, 1965, or insoluble inorganic salts such as those described in Trevoy U.S. Pat. 3,428,451 issued Feb. 18, 1969.

The photographic layers and other layers of a photographic element employed and described herein can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

The photographic layers employed with the invention described herein can contain plasticizers and lubricants such as polyalcohols, e.g., glycerin and diols of the type described in Milton et al. U.S. Pat. 2,960,404 issued Nov 1, 1966; fatty acids or esters such as those described in Robijns U.S. Pat. 2,588,765 issued Mar. 11, 952, and Duane U.S. Pat. 3,121,060 issued Feb. 11, 1964; and silicone resins such as those described in DuPont British Pat. 955,061.

The photographic layers employed as described herein may contain surfactants such as saponin; anionic compounds such as the alkyl aryl sulfonates described in Baldsifen U.S. Pat. 2,600,831 issued June 17, 1962; amphoteric compounds such as those described in Ben-Ezra U.S. Pat. 3,133,816 issued May 19, 1964; and water soluble adducts of glycidol and an alkyl phenol such as those described in Olin Mathieson British Pat. 1,022,878.

The photographic elements which can be employed with this invention may contain matting agents such as starch, titanium dioxide, zinc oxide, silica, polymeric beads including beads of the type described in Jelley et al. U.S. Pat. 2,992,101 issued July 11, 1961, and Lynn U.S. Pat. 2,701,245 issued Feb. 1, 1955.

The photographic elements used with this invention may contain brightening agents including stilbenes, triazines, oxazoles and coumarin brightening agents. Water soluble brightening agents may be used such as those described in Albers et al. German Pat. 972,067 and McFall et al. U.S. Pat. 2,933,390 issued Apr. 19, 1960, or dispersions of brighteners may be used such as those described in Jansen German Pat. 1,150,274, Oetiker et al. U.S. Pat. 3,406,070 issued Oct. 15, 1968, and Heidke French Pat. 1,530,244.

Spectral sensitizing dyes can be used conveniently to confer additional sensitivity to the light sensitive silver halide emulsion of a multilayer photographic elements employed in the practice of this invention. For instance, additional spectral sensitization can be obtained by treating the emulsion with a solution of a sensitizing dye in an organic solvent or the dye may be added in the form of a dispersion as described in Owens et al. British Pat. 1,154,781. For optimum results, the dye may either be added to the emulsion as a final step or at some earlier stage.

Sensitizing dyes useful in sensitizing such emulsions are described, for example, in Brooker et al. U.S. aPt. 2,526,632 issued Oct. 24, 1950; Sprague U.S. Pat. 2,503,776 issued Apr. 11, 1950; Brooker et al. U.S. Pat. 2,493,748 issued Jan. 10, 1950; and Taber et al. U.S. Pat. 3,384,486 issued May 21, 1968. Spectral sensitizers which can be used include the cyanines, merocyanines, complex (tri or tetranuclear) merocyanines, complex (tri or tetranuclear) cyanines, holopolar cyanines, styryls, hemicyanines (e.g. enamine hemicyanines), oxonols and hemioxonols.

Dyes of the cyanine classes may contain such basic nuclei as the thiazolines, oxazolines, pyrrolines, pyridines, oxazoles, thiazoles, selenazoles and imidazoles. Such nuclei may contain alkyl, alkylene, hydroxyalkyl, sulfoalkyl, carboxylalkyl, aminoalkyl and enamine groups and may be fused to carbocyclic or heterocyclic ring systems either unsubstituted or substituted with halogen, phenyl, alkyl, haloalkyl, cyano, or alkoxy groups. The dyes may be symmetrical or unsymmetrical and may contain alkyl, phenyl, enamine or heterocyclic substituents on the methine or polymethine chain.

The merocyanine dyes may contain the basic nuclei mentioned above as well as acid nuclei such as thiohydantoins, rhodanines, oxazolidenediones, thiazolidenediones, barbituric acids, thiazolineones, and malononitrile These acid nuclei may be substituted with alkyl, alkylene, phenyl, carboxyalkyl, sulfoalkyl, hydroxyalkyl, alkoxyalkyl, alkylamino groups or heterocyclic nuclei. Combinations of these dyes may be used, if desired. In addition, supersensitizing addenda which do not absorb visible light may be included, for instance, ascorbic acid derivatives, azaindenes, cadmium salts, and organic sulfonic acids as described in McFall et al. U.S. Pat. 2,933,390 issued Apr. 19, 1960, and Jones et al. U.S. Pat. 2,937,089 issued May 17, 1960.

Various layers including the photographic layers, employed in the practice of this invention can contain light absorbing materials and filter dyes such as those described in Sawdey U.S. Pat. 3,253,921 issued May 31, 1966; Gasper U.S. Pat. 2,274,782 issued Mar. 3, 1942; Silberstein et al. U.S. Pat. 2,527,583 issued Oct. 31, 1950; and VanCampen U.S. Pat. 2,956,879 issued Oct. 18, 1960. If desired, the dyes can be mordanted, for example, as described in Jones et al. U.S. Pat. 3,282,699 issued Nov. 1, 1966.

This invention may be used in elements designed for recording print out images as described in Fallesen U.S.

Pat. 2,369,449 issued Feb. 13, 1945, or Bacon et al. U.S. Pat. 3,447,927 issued June 3, 1969; direct print images as described in Hunt U.S. Pat. 3,033,682 issued May 8, 1962, and McBride U.S. Pat. 3,287,137 issued Nov. 22, 1966; elements designed for processing by heat as described in Sorensen et al. U.S. Pat. 3,152,904 issued Oct. 13, 1964, Morgan et al. U.S. Pat. 3,457,075 issued July 22, 1969, Stewart et al. U.S. Pat. 3,312,550 issued Apr. 4, 1967, and Colt U.S. Pat. 3,418,122 issued Dec. 24, 1968.

This invention may be used with elements designed for color photography, for example, elements containing color-forming couplers such as those described in Frohlich et al. U.S. Pat. 2,376,679 issued May 22, 1945, Jelley et al. U.S. Pat. 2,322,027 issued June 15, 1943, Fierke et al. U.S. Pat. 2,801,171 issued June 30, 1957, Godowsky U.S. Pat. 2,698,794 issued Jan. 4, 1955, Barr et al. U.S. Pat. 3,227,554 issued Jan. 4, 1966, and Graham et al. U.S. Pat. 3,046,129 issued July 24, 1962; or elements to be developed in solutions containing color-forming couplers such as those described in Mannes et al. U.S. Pat. 2,252,718 issued Aug. 19, 1941, Carroll et al. U.S. Pat. 2,592,243 issued Apr. 8, 1952, and Schwan et al. U.S. Pat. 2,950,970 issued Aug. 30, 1960; and in false-sensitized color materials such as those described in Hanson U.S. Pat. 2,763,549 issued Sept. 18, 1956.

The invention has been described in detail with particular reference to preferred embodiments thereof, but it will be understood that variations and modifications can be effected within the spirit and scope of the invention.

There is claimed:

1. A method for the preparation of 3,4-dihydro-6-hydroxy-2H-1,3-benzoxazine having the formula:

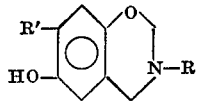

said method comprising reacting a hydroquinone in about stoichiometric quantities, and in an anhydrous aprotic solvent, having the formula:

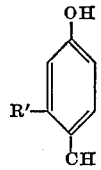

wherein R' is an alkyl having 1–12 carbon atoms or H with a bis (alkoxymethyl) amine having the formula:

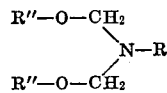

wherein R" is an alkyl having 1–12 carbon atoms and R is selected from the group consisting of:
   (1) alkyl having 1–12 carbon atoms;
   (2) aminomethyl;
   (3) N,N-dimethylaminoethyl or N,N-diethylaminoethyl;
   (4) methyl cyclohexyl;
   (5) phenyl or naphthyl;
   (6)  —$R_7$    wherein $R_7$=H or $CH_3$;

(7) hydroxyalkyl having 2–3 carbon atoms; and
   (8) alkenyl having 3–4 carbon atoms at a temperature below about 25° C. in the presence of a strong mineral acid.

2. The method of claim 1 wherein said hydroquinone and said bis(alkoxymethyl) amine are reacted at a temperature in the range of about −10° C. to about −40° C.

3. A 3,4-dihydro-3,7-disubstituted-6-hydroxy-2H-1,3-benzoxazine having the formula:

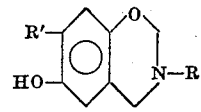

wherein R' is a straight alkyl having 1–12 carbon atoms or a branched-chain alkyl having 6–12 carbon atoms, and R is selected from the group consisting of:
   (1) alkyl having 1–12 carbon atoms;
   (2) aminomethyl;
   (3) dimethylaminoethyl or diethylaminoethyl;
   (4) methyl cyclohexyl;
   (5) phenyl or naphthyl;
   (6) 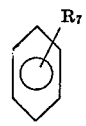 $R_7$   wherein $R_7$=H or $CH_3$;

(7) hydroxyalkyl having 2–3 carbon atoms; and
   (8) alkenyl having 3–4 carbon atoms.

4. A 3,4-dihydro-3,7-dialkyl-6-hydroxy-2H-1,3-benzoxazine having the formula:

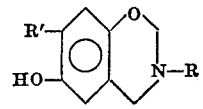

wherein R' is a straight chain alkyl having 1–6 carbon atoms or a branched-chain alkyl having 6–12 carbon atoms, and R is independently alkyl having 1 to 6 carbon atoms.

5. A 3,4-dihydro-3-alkyl-7-methyl-6-hydroxy-2H-1,3-benzoxazine in which said alkyl group has 1–6 carbon atoms.

6. 3,4-dihydro-3,7-dimethyl-6-hydroxy-2H-1,3-benzoxazine.

References Cited

Weatherbee et al.: Chemical Abstracts, vol. 53, col. 377–78 (1959).

Burke et al.: J. Org. Chem., vol. 28, pp. 1098–1100 (1963).

Kuehne et al.: J. Med. and Pharm. Chem., vol. 5, pp. 257–280 (1962).

Gaines et al.: J. Het. Chem., vol. 8, pp. 249–51 (1971).

Stewart et al.: J. Am. Chem. Soc., vol. 54, pp. 4172–83 (1932).

Burke et al.: J. Am. Chem. Soc., vol. 76, pp. 1677–79 (1954).

Fields et al.: J. Org. Chem., vol. 27, pp. 2749–2753 (1962).

Swanson, Master's Thesis at South Dakota School of Mines and Technology, "Reactions of N,N-Di(Alkoxy methyl) Alkylamines with Phenols," pp. 1–28 (1968).

HARRY I. MOATZ, Primary Examiner

U.S. Cl. X.R.

260—570.9; 96—110